June 9, 1931.  A. N. TEBIEFF  1,809,740
CHILD'S VEHICLE
Filed June 3, 1929  2 Sheets-Sheet 1
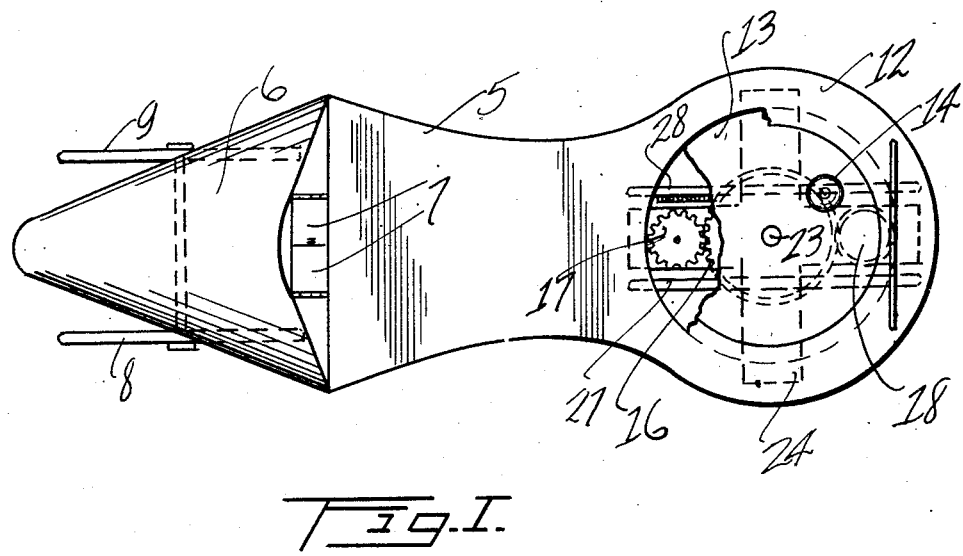
Fig. I.
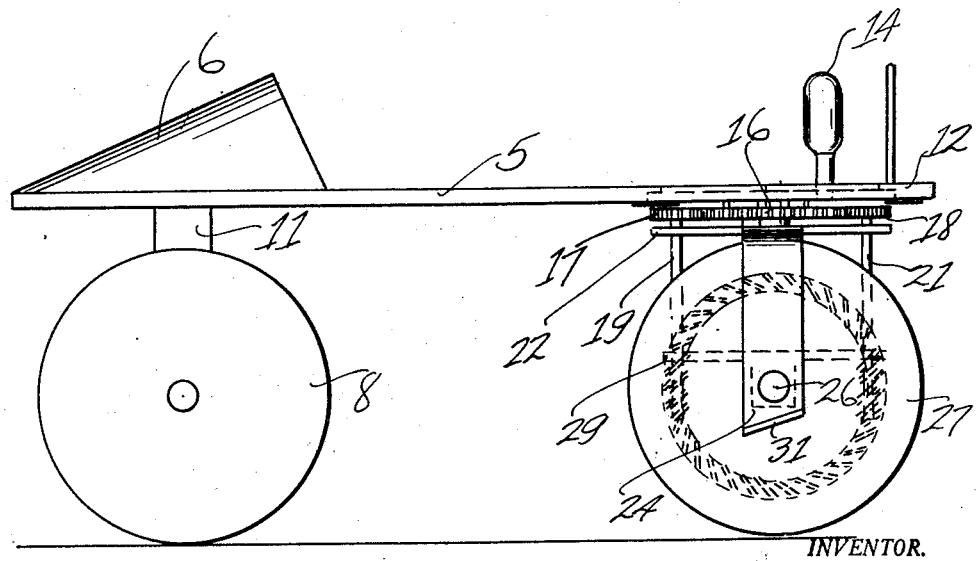
Fig. II.
INVENTOR.
A. N. TEBIEFF
BY Victor J. Evans
ATTORNEYS

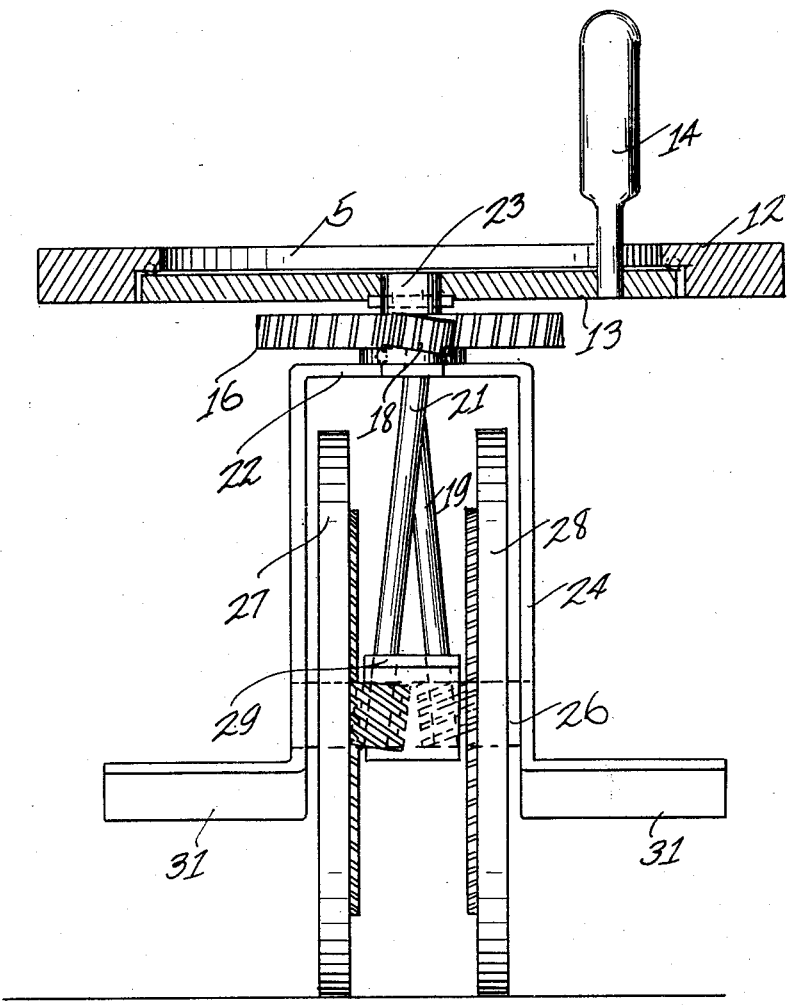
Fig. III.

Patented June 9, 1931

1,809,740

UNITED STATES PATENT OFFICE

ALEXANDER N. TEBIEFF, OF LOS ANGELES, CALIFORNIA

CHILD'S VEHICLE

Application filed June 3, 1929. Serial No. 367,999.

This invention relates to improvements in a child's vehicle.

The principal object of this invention is to provide means whereby a child may sit upon the vehicle and propel the same without undue manual effort.

Another object of the present invention is to provide a device wherein the child may readily propel the vehicle up grades as well as come down grades without danger of losing control of the vehicle while on the grade.

A further object of the present invention is to provide a vehicle which is simple in construction, neat in appearance and one which will be economical to manufacture.

A still further object is to provide a vehicle which may be readily steered, even while actuating the propelling mechanism.

Other objects and advantages will be apparent during the course of the following description.

In the accompanying drawings forming a part of this specification, and in which like numerals are employed to designate like parts throughout the same, Figure I is a top plan view of my vehicle, and Figure II is a side elevation of Figure I.

Fig. III is a front elevation partly in cross-section.

There are many forms of vehicles for children now upon the market which employ gearing for the purpose of controlling the vehicle. In most instances, as far as applicant is aware, the form of gearing is such that a large amount of effort is required to accomplish the propulsion, the effort in fact being so great that it is impossible for a child to propel the vehicle up a stiff grade.

I have therefore devised a very simple driving mechanism wherein the gearing arrangement permits the propelling of the vehicle up grades of considerable pitch.

In the accompanying drawings wherein for the purpose of illustration is shown a preferred embodiment of my invention the numeral 5 designates the body of the vehicle upon which the child sits. A fanciful end 6 provides space for a tool box or whatever equipment is to be carried on the vehicle. Access is gained to the interior through doors 7.

Wheels 8 and 9 are carried upon the rear of the vehicle as by a yoke 11. The forward portion of the vehicle is essentially a ring 12 within which is positioned a rotary disc 13 which may be rotated through the medium of a handle 14. Secured to the underside of the disc 13 is a master gear 16, which master gear in turn is adapted to mesh with planetary gears 17 and 18. These planetary gears are carried upon the ends of driving shafts 19 and 21, respectively, which driving shafts are journaled in a bearing plate 22 carried upon a king bolt 23.

The bearing plate 22 has downwardly bent ends 24. Between these ends there is positioned an axle 26. This axle serves to support spaced steering wheels 27 and 28 and also a bearing plate 29 which is positioned therebetween and is carried on a block mounted on this axle. The driving shafts 19 and 21 are each provided with worms which mesh with a gear carried on each of the wheels 27 and 28, that is to say, the gear carried on the shaft 19 meshes with the worm gear on one of the wheels as for instance, the wheel 28, while the worm carried on the shaft 21 will mesh with the gear carried on the wheel 27.

The result of this construction is that when the child sits upon the vehicle with his feet upon the out-turned foot rest 31 which is the continuation of the bent ends of the plate 22, the child is then in a position to steer the vehicle through the movement of the feet and by grasping the handle 14 and rotating the same about the king pin 23, rotary motion will be transmitted from the disc 13 through the master gear 16 to the planetary gears 17 and 18 and through their respective driving shafts and worms to the wheels 27 and 28.

It will thus be seen that this gearing arrangement produces a very powerful leverage which enables a child to easily propel the vehicle.

It is to be understood that the form of my invention herewith shown and described is to be taken as a preferred example of the same, and that various changes relative to the shape, size, material and arrangement of parts may be resorted to without departing from the spirit of the invention or the scope of the subjoined claim.

Having thus described my invention, I claim:—

In a child's vehicle, a base, a disc rotatably secured in said base, means for rotating said disc, a master gear secured in said disc, a bearing plate pivotally positioned beneath said master gear, shafts carried in said bearing plate, planetary gears carried on said shafts and engaging said master gear, gears at the lower extremities of said shafts, a pair of steering wheels mounted below said bearing plate, said steering wheels having gears formed thereon and adapted to mesh with said last mentioned gears, for the purpose specified.

In testimony whereof I affix my signature.

ALEXANDER N. TEBIEFF.